March 22, 1960 G. SALMET 2,930,001

AUTOMATIC FREQUENCY STABILIZATION

Filed Dec. 14, 1955 2 Sheets-Sheet 1

INVENTOR
GASTON SALMET
BY [signature]
AGENT

AUTOMATIC FREQUENCY STABILIZATION

Filed Dec. 14, 1955 2 Sheets-Sheet 2

INVENTOR
GASTON SALMET
BY [signature]
AGENT

Patented Mar. 22, 1960

2,930,001

AUTOMATIC FREQUENCY STABILIZATION

Gaston Salmet, Courbevoie, France, assignor, by mesne assignments, to North American Philips Company, Inc., New York, N.Y., a corporation of Delaware Application December 14, 1955, Serial No. 553,132

Claims priority, application France December 16, 1954

2 Claims. (Cl. 331—17)

This invention relates to a circuit-arrangement for automatic stabilization of the frequency of a high-frequency oscillator relatively to the frequency of at least one pilot wave by means of a frequency-corrector which is coupled to the high-frequency oscillator and controllable by means of a control voltage, the arrangement comprising a control-voltage generator with a mixer which functions as a phase-discriminator and is controlled by means of impulses, which are in synchronism with one of the pilot voltages, and a voltage taken from the high-frequency oscillator, a control voltage derived from the output circuit of the phase-discriminator controlling the frequency-corrector via a low-pass filter in order to stabilize the frequency of the high-frequency oscillator with respect to a higher harmonic of the pulse repetition frequency.

Such devices are known, for example, from U.S. Patent Nos. 2,574,482 and 2,736,803, issued on November 13, 1951, and February 28, 1956, respectively.

Particular attention invariably has to be paid to the size of the low-pass filter inserted in the control-voltage circuit of such AFC-circuits. It serves to considerably attenuate the pilot frequency and its harmonics, since in the case of insufficient attenuation they control the frequency-corrector and frequency-modulate the output voltage of the high-frequency oscillator, which results in the production of sideband frequencies normally occurring with frequency-modulation. Otherwise, the low-pass filter of the control-voltage circuit should have a maximum pass-band, since in the absence of stabilization the beat-frequency between a multiple of the pilot frequency and the frequency of the high-frequency oscillator has to be passed on until so-called "catching" via frequency-modulation of the high-frequency oscillator occurs. If this beat-frequency is passed only, when it is very low, the catching range of the AFC-circuit is unduly limited, namely to a value considerably smaller than the so-called holding range.

Finally, stringent requirements are imposed on the phase-characteristic of the control-voltage filter, since the AFC-circuit may become unstable even if the phase-displacement of the filter is as low as 90°, at variance with the well-known "Nyquist-criterion" of 180° with normal inverse feedback.

The desiderata imposed on the filter, which have only briefly been referred to in the foregoing, are explicity described in par. 7 of an article of J. Bruysten c.s. published in "Communication News," volume XIII, No. 1, dated February 1953.

In many known AFC-circuits of the type referred to in the preamble a search-voltage generator is employed in order to extend the catching range, which generator causes slow frequency-modulation of the high-frequency oscillator until locking, i.e. catching of the high-frequency oscillator to a higher harmonic of the pilot voltage, occurs. However, the use of the search-voltage generator often complicates the circuit-arrangement fairly considerably.

Particular desiderata are sometimes imposed on the modulation characteristic of the loop-circuit in connection with stabilization of the high-frequency oscillator, for example to a frequency-modulated pilot wave. In such a case, the modulation characteristic should be flat, that is to say the response sensitivity of the loop-circuit to voltages of modulation-frequency should be substantially constant within the range of modulation-frequencies. In practice, this is often difficult to achieve and the modulation-characteristic is often markedly peaked about a comparatively low frequency of, say, 8 to 10 kc./s.

In other circuits of the type referred to, particularly loop-circuits, in which the high-frequency oscillator is stabilized relatively to at least two pilot waves, for example as described in U.S. patent application Serial No. 337,592, filed February 18, 1953, Patent No. 2,870,330 issued January 20, 1959, in which these pilot waves are supplied to two successive frequency changers of the loop-circuit, suppression of undue mixing products entails particular difficulties. However, such unwanted mixing products provoke, via the frequency-corrector, parasitic frequency-modulation of the high-frequency oscillator-signal, which is undesirable.

The present invention has for its object to improve arrangements of the type referred to in the preamble, thereby mitigating or obviating one or more of said limitations.

To this end, in accordance with the invention, the pilot-voltage circuit connected to an input of the phase-discriminator comprises a phase-modulator, which is controlled by a feedback voltage derived from the output circuit of the phase-discriminator.

In order that the invention may be readily carried into effect, an example will now be described in detail with reference to the accompanying drawings, in which Fig. 1 shows in block-schematic form a conventional arrangement comprising an oscillator which is stabilized to a harmonic of impulses.

Figure 1:
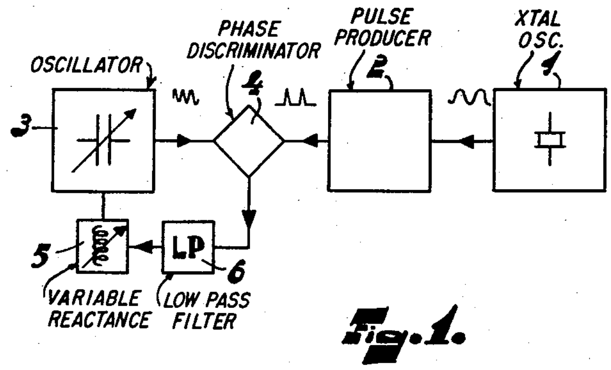

In the conventional arrangement shown in Fig. 1, the reference numeral 1 denotes a crystal-controlled oscillator supplying a sinusoidal output voltage of constant frequency. This voltage synchronizes a pulse producer 2 which supplies equidistant pulses of short duration, say, 1/100 of one period of the sinusoidal voltage of the crystal-oscillator 1. The oscillator to be frequency-stabilized is denoted by 3 and its sinusoidal output voltage is compared, in a frequency-changer 4 functioning as a phase-discriminator, with the peaked pulses from the pulse producer 2. The frequency-changer 4 is normally cut off and is each time released for a short time by a peaked pulse supplied to it. In the output circuit of this frequency-changer pulses appear having an amplitude which depends upon the instantaneous value of the sinusoidal voltage from the oscillator 3 during the occurrence of a pulse, in other words the amplitude of the output pulses depends upon the phase-relationship between the sinusoidal voltage of the oscillator 3 and the pulses of the pulse producer 2. The frequency-changer 4, which may be a peak-detector, consequently supplies an output voltage which, after smoothing by means of a low-pass filter 6, is suited to controlling a variable reactance 5, for example a reactance tube, coupled to the oscillator 3.

Upon stabilization of the oscillator 3 to a harmonic of the repetition frequency of the pulses from the pulse producer 2 there is a fixed phase-relationship between the sinusoidal voltage of the oscillator 3 and the pulses, the control-voltage supplied to the variable reactance then essentially being a direct voltage.

As soon as the frequency of the oscillator 3 tends to vary this involves a variation of the aforesaid phase-relationship, hence a variation of the control-voltage taken from the output of the phase-discriminator 4. Upon appropriate poling in the control-circuit, the control-voltage variation thus produced will prevent the frequency of the oscillator 3 from changing.

As is known, the use of an arrangement as shown in Fig. 1 enables the frequency of the oscillator 3 to be stabilized to different harmonics and even very high harmonics of the pulse repetition frequency. A choice of the desired harmonic of the pulse repetition frequency is made by initially setting the oscillator 3 approximately to the desired frequency.

Figure 4:
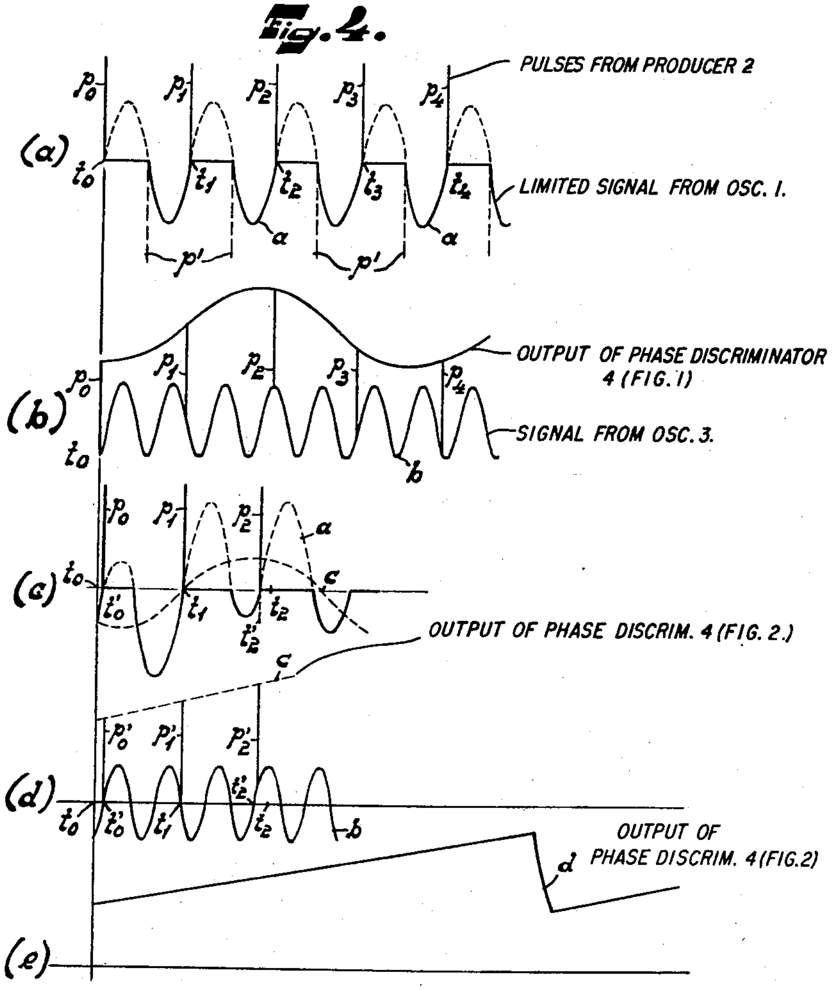
Fig. 4 shows voltage versus time diagrams for explaining the operation of arrangements in accordance with the invention as shown in Figures 2 and 3.

Failing stabilization of the oscillator 3 to a harmonic of the pulse repetition frequency, the operation of the phase-discriminator 4 departs from the aforesaid operation, as will be explained with reference to Fig. 4.

In Fig. 4*a*, the curve *a* represents the sinusoidal output voltage of the crystal oscillator 1. In the pulse producer 2, this voltage is limited, for example to zero level, and strictly equidistant positive pulses appear at instants $t_0$, $t_1$, $t_2$ and so on. Moreover, negative pulses $p'$ are produced which however, are not utilized and will therefore be left out of consideration.

In the phase-discriminator 4, as shown in Fig. 4*b*, pulses *p* are superposed on a sinusoidal voltage *b* from the oscillator 3 to be stabilized. So long as this oscillator has not been synchronized, the pulses *p* and the voltage *b* are in variable phase-relationship. Peak-detection of the superposed voltages shown in Fig. 4*b* yields a sinusoidal output voltage *c* which is supplied to the reactance tube 5 through the lowpass filter 6. Dependent upon its frequency this output voltage is attenuated to a greater or lower degree by the lowpass filter 6. In order to secure synchronization the frequency of the oscillator 3 should increase in the case illustrated in Fig. 4*b*. If the reactance tube 5 causes an increase in frequency upon an increase in control-voltage *c*, synchronization can be secured only during the rise of the curve *c* and this only when the frequency of the control-voltage *c* is not too high, since otherwise the low-pass filter 6 causes high attenuation.

As is obvious from Fig. 4*b*, the maximum and minimum values of the output voltage of the discriminator 4 occur at a phase-displacement of $$\pm\frac{\pi}{2}$$

of the pulses with respect to a zero cross-over of the sinusoidal voltage *b*, that is to say whenever a pulse coincides with a maximum or a minimum of the curve *c*.

However, *n*-periods of the oscillation *b* occur between two successive pulses if *n* represents the ordinal number of the harmonic of the pulse repetition frequency to which the oscillator 3 is to be stabilized. This ordinal number will, in general, be fairly high and may, for example, be 10 to 100.

Hence, reckoned with respect to a single period of wave *b*, a phase-variation of $$\frac{\pi}{2n}$$

involves a control-voltage variation from the maximal to the minimal value.

The idea underlying the invention is a temporary increase of the last-mentioned phase difference by modulating the phase of the pulses in accordance with the output voltage of the discriminator such that the phase of the pulses follows, at least temporarily, that of the sinusoidal voltage of the oscillator 3.

Figure 2:
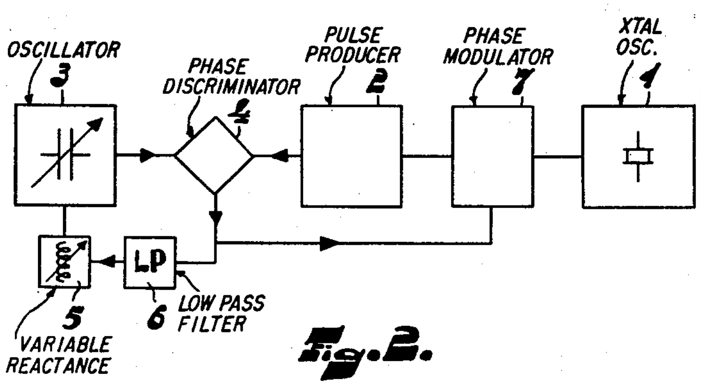
Fig. 2 shows in block-schematic form the same arrangement completed in accordance with the invention.

To this end, the conventional arrangement shown in Fig. 1 is, in accordance with the invention, completed as shown in Fig. 2, in which corresponding elements are provided with the same reference numerals as in Fig. 1.

Contrary to the arrangement shown in Fig. 1, the arrangement shown in Fig. 2 comprises a phase-modulator 7 between the crystal oscillator 1 and the pulse-producer 2. This phase-modulator 7 is controlled by an output voltage derived from the phase-discriminator 4. As will be explained with reference to Fig. 3 the pulse producer 2 and the phase-modulator 7 may be united in a single valve stage.

The influence of the phase-modulator will be explained with reference to Figures 4*c* to 4*e*.

During the rise of the curve *c* in Fig. 4*c* the pulses no longer occur at the instants $t_0$, $t_1$, $t_2$ and so on, but at instants $t'_0$, $t_1$, $t'_2$ and so on, the instant $t'_0$ being delayed in comparison with the instant $t_0$, while $t'_2$ is advanced relatively to $t_2$. As a result the time intervals between the pulses $p'_0$, $p_1$ and $p'_2$ will be shorter than those between the pulses $p_0$, $p_1$, $p_2$ and so on. This means that the repetition frequency of the pulses has temporarily increased. Hence, as a result of feedback, the phase-discriminator 4 no longer delivers a voltage according to the curve *c* shown in Figs. 4*b* and 4*c*, but a voltage $c'$ increasing more slowly as shown in Fig. 4*d*.

Contrary to what happens during the rise of the curve *c*, either the spacing of successive pulses during decay will be increased or the pulse repetition frequency will temporarily be decreased which results in an accelerated decrease in output voltage of the phase-discriminator 4.

The aforesaid position-modulation of the pulse instants due to the feedback voltage taken from the phase-discriminator 4 produces a sawtooth output voltage of the phase discriminator 4 with slowly rising and slowly falling flanks as shown at *d* in Fig. 4*e*. Since the fundamental frequency of this sawtooth voltage is lower than the frequency of the wave *c* appearing in the absence of feedback (Fig. 4*b*), this sawtooth voltage will be less attenuated by the low-pass filter 6, hence more easily effect sufficient frequency-modulation of the oscillator 3 until it is in synchronism with the desired harmonic of the pulse repetition frequency.

It is advantageous to choose the phase-modulator such that a given phase-shift of the voltage of the oscillator 3 involves the same phase-shift of the pulses, reckoned with respect to the angular frequency of the oscillator 3.

It has been found experimentally that such a choice enables the catching range for the loop-circuit to be increased approximately by a factor *n*, if *n*, as before, represents the ratio of the frequencies of the oscillators 3 and 1, naturally on the understanding that the catching range of the circuit-arrangement can not exceed the so-called holding range (that is to say the maximum control range of the reactance circuit).

Moreover, it is found that, when using the invention, the stability of the loop-circuit during catching is improved in accordance with the harmonic frequency-relationship of the oscillators 3 and 1, in other words the loop-amplification is then lower approximately by a factor *n*.

Figure 5:
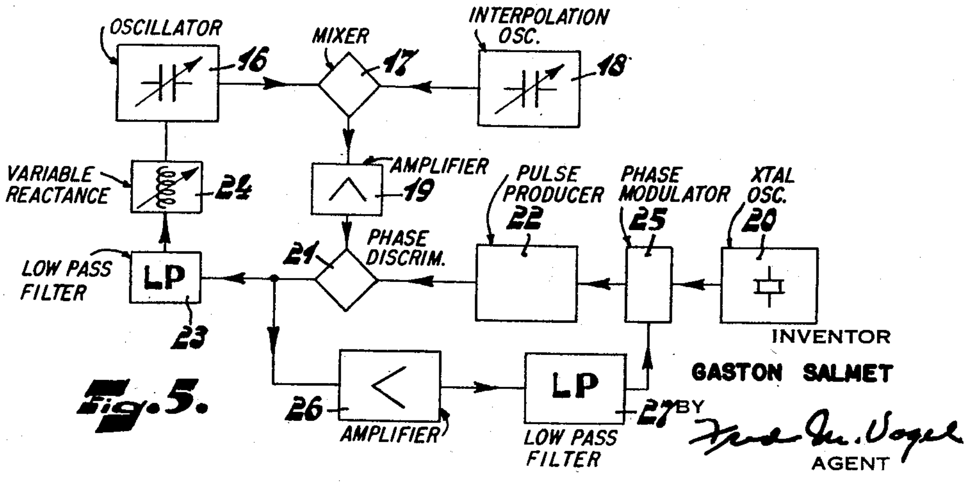
Fig. 5 shows in block-schematic form an arrangement in accordance with the invention, in which an oscillator is stabilized with respect to two pilot waves.

Finally noise spurious voltages superposed on the control voltage are found to be attenuated in accordance with the harmonic frequency-relationship *n*, which particularly in arrangements of the type set out with reference to Fig. 5 and comprising a plurality of frequency-changers in the loop-circuit, is of importance in order to limit parasitic frequency-modulation of the output oscillation due to undesired mixing products of comparatively low frequency superposed on the control voltage.

A suitable form of a pulse-phase modulator to be used in accordance with the invention will now first be described with reference to Fig. 3.

Figure 3:
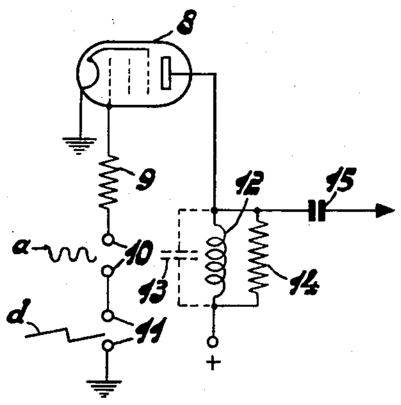
Fig. 3 shows the detailed circuit of a phase-modulator for use in the arrangement shown in Fig. 2.

The phase-modulator shown in Fig. 3 comprises a pentode 8, to the control grid of which the sinusoidal voltage *a* shown in Fig. 4*a* is applied by way of a series-resistor 9, via terminals 10 and moreover via terminals 11 a sawtooth voltage that is to say the voltage corresponding to the curve *d* shown in Fig. 4*e*. If exclusively the sinusoidal voltage *a* is active in the control-grid circuit of the pentode 8, the voltage set up at the control grid varies according to the curve *a* represented by a solid line in Fig. 4*a*, since the positive half waves of the sinusoidal voltage supplied are suppressed due to the occurrence of grid current. The voltage thus limited is amplified by the tube and produces a current of the same form in a coil 12 inserted in the anode circuit. This coil 12, together with the parasitic capacity 13 shown in broken lines, constitutes a circuit which is tuned to a comparatively high frequency. Connected in parallel with this oscillatory circuit is a resistor 14 having such a value as to secure critical damping of the oscillatory circuit.

At the instants at which the control voltage passes the limiting level, the oscillatory circuit 12 to 14 is energized, thus producing, at instants $t_0$, $t_1$, $t_2$ and so on, across the circuit a positive half wave which is supplied through a coupling capacitor 15 to the frequency changer 4 shown in Fig. 2.

If besides the sinusoidal voltage *a* the sawtooth voltage *d* is active in the control-grid circuit of the pentode 8, pulses are produced at shifted instants, for example $t'_0$, $t_1$ and $t'_2$ as explained with reference to Fig. 4*d*.

Thus as in the form shown in Fig. 3, the phase-modulator 7 and pulse producer 2 shown in block-schematic form in Fig. 2, are united into a single tube stage.

Fig. 5 shows a form of the arrangement in accordance with the invention, in which the frequency of an oscillator is stabilized with respect to two pilot waves.

For this purpose the output voltage of an oscillator 16 to be stabilized is mixed in mixer 17, with the output voltage of a stable interpolation oscillator 18 is order to obtain a difference frequency which is amplified by means of a tuned amplifier 19. The interpolation oscillator 18 may have an adjustable frequency.

In the phase-discriminator 21 the difference frequency from the amplifier 19 is compared with a harmonic of a frequency delivered by the crystal oscillator 20. To this end, the output voltage of the crystal oscillator 20 controls, similarly to the block-diagrams shown in Figures 1 and 2, a pulse producer 22, the output pulses of which each time momentarily release a mixer functioning as a phase-discriminator. If the difference frequency taken from the amplifier 19 and a harmonic of the pulse-repetition frequency are equal, the phase-discriminator 21 delivers a D.C.-voltage, which after smoothing by means of a low-pass filter 23, controls a variable reactance 24 coupled to the oscillator 16 to be stabilized.

The arrangements so far described with reference to Fig. 5 are known from the aforesaid U.S. Patent application Serial No. 337,592.

In devices of this type, undesired mixing products produced in the frequency changer 17, may cause amplitude-modulation of the control voltage taken from the phase-discriminator 21, which causes parasitic frequency-modulation of the oscillator 16, inasmuch as the undesired alternating voltages produced are insufficiently attenuated by the low-pass filter 23.

In accordance with the invention a phase-modulator 25 is provided between the crystal oscillator 20 and the pulse-producer 22, similarly as the phase-modulator 7 shown in Fig. 2. This phase-modulator 25 may be the same as that shown in Fig. 3.

The phase-modulator 25 is controlled by means of a voltage taken, via an amplifier 26 and a low-pass filter 27, from the output of the phase-discriminator 21. The low-pass filter 27 serves to suppress high frequencies, inter alia, the pulse-repetition frequency, produced in the output of the phase-discriminator 21.

As explained with reference to Fig. 2, the phase-modulator controlled by a feedback voltage yields a greater stability of the loop-circuit 16, 17, 19, 21, 23, 24 and an extension of the catching range approximately to the so-called holding range. Moreover, the phase-modulator damps spurious voltages superposed on the control voltage, independently of their origin, thus likewise damping spurious voltages generated due to undesired mixing products. This damping is proportional to the harmonic frequency-relationship between the difference frequency from an amplifier 19 and the frequency of the crystal oscillator 20.

What is claimed is:

1. An oscillator stabilization circuit comprising an oscillator to be stabilized, a source of a pilot oscillation, a phase discriminator, means for connecting said oscillator to a first input of said phase discriminator, means including a phase modulator connected between said source of a pilot oscillation and a second input of said phase discriminator, means connecting the output of said phase discriminator to said oscillator to control the frequency thereof, and means connecting said output of the phase discriminator to said phase modulator whereby the phase of said pilot oscillation is modulated by the output signal of said phase discriminator.

2. An oscillator stabilization circuit comprising an oscillator to be stabilized, a source of a pilot oscillation, a phase discriminator, means for connecting said oscillaator to a first input of said phase discriminator, a pulse producer having an output connected to a second input of said phase discriminator and having an input terminal, a phase modulator connected between said source of a pilot oscillation and said input terminal, a low-pass filter connected to apply the output of said phase discriminator to said oscillator to control the frequency thereof, and means connecting said output of the phase discriminator to said phase modulator whereby the phase of said pilot oscillation is modulated by the output signal of said phase discriminator.

References Cited in the file of this patent

UNITED STATES PATENTS

| | | |
|---|---|---|
| 2,245,627 | Varian | June 17, 1941 |
| 2,770,730 | Urtel | Nov. 13, 1956 |